(12) United States Patent
Hars et al.

(10) Patent No.: US 11,238,184 B2
(45) Date of Patent: Feb. 1, 2022

(54) SECURE VEHICLE CONTROL UNIT

(71) Applicant: Aptiv Technologies Limited, St. Michael (BB)

(72) Inventors: Aurelien Hars, Dusseldorf (DE); Matthias Rieke, Korschnbroich (DE)

(73) Assignee: Aptiv Technologies Limited, St. Michael (BB)

( * ) Notice: Subject to any disclaimer, the term of this patent is extended or adjusted under 35 U.S.C. 154(b) by 273 days.

(21) Appl. No.: 16/520,970

(22) Filed: Jul. 24, 2019

(65) Prior Publication Data
US 2020/0042751 A1 Feb. 6, 2020

(30) Foreign Application Priority Data
Aug. 3, 2018 (EP) .................................... 18187238

(51) Int. Cl.
*G06F 21/86* (2013.01)
*H05K 5/02* (2006.01)
*H05K 5/06* (2006.01)
*H04L 29/08* (2006.01)
*G06F 21/71* (2013.01)
*G06F 21/60* (2013.01)
*G06F 21/85* (2013.01)

(52) U.S. Cl.
CPC ............ *G06F 21/86* (2013.01); *G06F 21/604* (2013.01); *G06F 21/71* (2013.01); *G06F 21/85* (2013.01); *H04L 67/12* (2013.01); *H05K 5/0208* (2013.01); *H05K 5/06* (2013.01); *G06F 2221/2143* (2013.01); *H05K 2201/10151* (2013.01)

(58) Field of Classification Search
CPC ........ G06F 21/86; G06F 21/604; G06F 21/71; G06F 21/85; G06F 2221/2143; H04L 67/12; H05K 5/0208; H05K 5/06; H05K 2201/10151
See application file for complete search history.

(56) References Cited

U.S. PATENT DOCUMENTS

| 5,694,335 | A | 12/1997 | Hollenberg |
| 6,249,061 | B1 | 6/2001 | Roberts et al. |
| 6,396,400 | B1 | 5/2002 | Epstein et al. |
| 7,836,516 | B2 | 11/2010 | Stidl et al. |
| 8,279,075 | B2 | 10/2012 | Fleischman et al. |

(Continued)

FOREIGN PATENT DOCUMENTS

| DE | 195 12 266 A1 | 3/1996 |
| DE | 100 01 260 C1 | 8/2001 |

(Continued)

*Primary Examiner* — Hee K Song
(74) *Attorney, Agent, or Firm* — Colby Nipper PLLC

(57) ABSTRACT

The present invention relates to a vehicle control unit that includes a microcontroller unit, a sealing controller unit including a memory for storing a validity state, an electrical connector configured to couple the microcontroller unit to the sealing controller unit, and a housing enclosing the microcontroller unit, the sealing controller unit, and the electrical connector. The microcontroller unit is configured to determine the validity state of the sealing controller unit via the electrical connector, and the sealing controller unit is configured to detect a mechanical change to the housing and to change the validity state when such a mechanical change is detected.

29 Claims, 3 Drawing Sheets

(56) References Cited

U.S. PATENT DOCUMENTS

| | | | |
|---|---|---|---|
| 9,009,860 B2 | 4/2015 | Klum et al. | |
| 9,717,154 B2 * | 7/2017 | Brodsky | H05K 13/00 |
| 10,098,235 B2 * | 10/2018 | Dangler | H05K 1/09 |
| 2001/0027668 A1 | 10/2001 | Donner et al. | |
| 2008/0073491 A1 * | 3/2008 | Fleischman | G08B 13/1481 |
| | | | 250/214 DC |
| 2010/0177487 A1 * | 7/2010 | Arshad | G06F 21/86 |
| | | | 361/737 |
| 2011/0258462 A1 | 10/2011 | Robertson et al. | |
| 2015/0382455 A1 * | 12/2015 | Enevoldsen | H05K 7/1422 |
| | | | 324/705 |
| 2016/0110567 A1 | 4/2016 | Rooyakkers et al. | |
| 2016/0152210 A1 | 6/2016 | Fulop | |
| 2017/0161527 A1 * | 6/2017 | Urda | G06F 21/87 |
| 2017/0277901 A1 * | 9/2017 | Hofleitner | F42D 3/00 |
| 2018/0114039 A1 * | 4/2018 | Sion | G06F 21/602 |
| 2019/0012483 A1 | 1/2019 | Thompson | |
| 2019/0215339 A1 * | 7/2019 | Chen | H04L 63/1425 |

FOREIGN PATENT DOCUMENTS

| | | |
|---|---|---|
| DE | 102 03 433 A1 | 8/2003 |
| EP | 1 142 765 A2 | 10/2001 |
| WO | 2010/076666 A1 | 7/2010 |
| WO | 2017/009634 A1 | 1/2017 |

\* cited by examiner

SECURE VEHICLE CONTROL UNIT

CROSS-REFERENCE TO RELATED APPLICATION

This application claims the benefit under 35 U.S.C. § 119(a) of European Patent Application EP 18187238.3, filed Aug. 3, 2018, the entire disclosure of which is hereby incorporated herein by reference.

TECHNICAL FIELD OF INVENTION

The present invention relates to a vehicle control unit comprising a housing enclosing components of the vehicle control unit.

BACKGROUND OF DISCLOSURE

As shown in FIG. 1, it is known to use a vehicle control unit housing 110, 120 to provide mechanical, electrical, and possibly also hermetical protection for the engine control unit 100. Conventionally, this protection is provided to allow safe operation of the device under different environmental, weather and operational conditions.

The housing 110 can include a cover portion 120 that is screwed, molded and/or sealed to form the protective casing 110, 120, in particular to shield or otherwise protect the vehicle control unit 100 against hazardous events or conditions which could potentially damage and/or impair the functionality of the engine control unit.

Thus, such protection is generally provided to prevent hazardous events, such as for example to prevent severe weather conditions, difficult operational conditions, vehicle collisions or road traffic accidents from jeopardizing automotive safety and vehicle operability, due to vehicle control unit 100 malfunction.

However, the vehicle control unit housing 110, 120 generally does not provide protection against intentional attacks aimed at mechanically opening or otherwise gaining access to interior components 130, 140 of the vehicle control unit housing 110, 120.

The attacks can be intended to gain malicious control of the vehicle control unit 100, for example to change settings and/or influence the functioning of the vehicle control unit 100.

Such malicious attacks can pose a serious threat to vehicle passengers and other traffic participants, and can be particularly problematic if affecting autonomous vehicles driving freely, i.e. without human interaction, on public streets.

To protect against such tampering, the car manufacturer could consider safety measures, such as for example adding a mechanical protection 150 (like sealing or taping) that will break upon tampering, and could thus be detected in the garage or by legal institutions when visually inspecting the vehicle.

Unfortunately, such safety measures are unlikely to be effective, because it could take a while until the visual inspection of the vehicle is performed. Moreover, implementing a sealing or adding a tape 150 to the housing 110, 120 does not allow the interior electronics 140 and the software running in the vehicle control unit 100 to become aware of any tampering attempts. Further, if a mechanical protection 150, such as for example a mechanical sealing 150, is replaced with an equivalent one, a malicious attack could go unnoticed to the visual inspection.

Alternatively, the vehicle control unit can be designed to verify if the housing has been opened, for example by implementing an electrical sensor for triggering a signal when a cover of the housing is being removed. However, such verification can only be performed if the engine control unit has power. In other words, if the opening happens at power off, it could go unnoticed, in particular if the manipulated engine control unit is replaced and the housing is closed prior to powering on the device.

SUMMARY OF THE DISCLOSURE

In view of the above, it is an object of the present invention to improve the protection of vehicle control units. This object is satisfied by a vehicle control unit according to claim 1. In accordance with the present invention, a vehicle control unit comprises a microcontroller unit, a sealing controller unit including a memory for storing a validity state, an electrical connector coupling the microcontroller unit to the sealing controller unit, and a housing enclosing the microcontroller unit, the sealing controller unit and the electrical connector. The microcontroller unit is configured to determine the validity state of the sealing controller unit via the electrical connector, and the sealing controller unit is configured to detect a mechanical change to the housing and to change the validity state when such a mechanical change is detected. More specifically, the housing encloses the microcontroller unit, the sealing controller unit and the electrical connector, and thus protects components of the vehicle control unit. Further, the sealing controller unit is configured to change its validity state if a mechanical change occurs to the housing.

For example, a mechanical force which is applied to the housing can cause a mechanical change to the housing, for example when the mechanical force is applied to open or otherwise expose the interior of the housing, for example by removing a cover of the housing or by excising an opening into a surface of the housing. In other words, the sealing controller unit is adapted to detect or be influenced by such a mechanical change to the housing, and to change its validity state if such a mechanical change occurs. For this purpose, the sealing controller unit includes memory for storing the validity state. Preferably the memory can include a memory chip, for example a read-only-memory (ROM) chip, further preferred a one-time programmable ROM chip.

In an example, the validity state can correspond to a variable or memory bits stored in the memory chip and which indicate whether a mechanical change to the housing has occurred or not. In a related example, the memory chip corresponds to a one-time programmable ROM chip which has been programmed to store a digital key, for example a digital key which is unique per vehicle control unit. In this case, if the content of the digital key changes, or if the digital key is no longer accessible due to damage caused to the memory chip, the validity state of the sealing controller unit has changed, indicating a mechanical change to the housing.

The microcontroller unit is configured to use the electrical connector to determine the validity state of the sealing controller unit. Thus, the microcontroller unit is configured to use the electrical connector to read the digital key, or to check the memory content and/or integrity of the memory of the sealing controller unit. Then, if the microcontroller unit determines that the digital key cannot be authenticated, i.e. is invalid or inaccessible, the microcontroller unit can conclude that a mechanical change has occurred to the housing, for example that the housing may have been tampered with. In other words, the microcontroller unit can be configured to determine the validity state of the sealing controller unit by verifying a digital key stored in the memory of the sealing controller unit. For this purpose, preferably, the microcontroller unit is configured to use an encryption/decryption algorithm to verify the digital key stored in the memory of the sealing controller unit, for example by running advanced encryption standard (AES) based encryption algorithms for performing authentication checks by comparison with a corresponding digital key stored in the microcontroller unit.

In an example, the memory of the sealing controller unit includes a one-time programmable read-only-memory (ROM) adapted to store the digital key of the sealing controller unit. For example, the microcontroller can comprise a hardware secure model (HSM) which can be used to generate a randomly generated digital key which is then stored in the one-time programmable read-only-memory (ROM) of the sealing controller unit.

In an example, the vehicle control unit is configured to provide a vehicle or car engine with controller functions, and when the microcontroller unit determines that the digital key is invalid, i.e. indicating that the housing may have been tampered with, the vehicle control unit can turn itself off, for example permanently, or configure itself to reduce the scope of provided controller functions. In this way, the possibility of maliciously manipulating the functioning of the vehicle control unit is significantly reduced, for example by limiting the controller function to a minimum still allowing safe operation of the vehicle.

Hence, the above arrangement of vehicle control unit components provides a secure sealing mechanism which allows the vehicle control unit to verify at any time if its housing may have been tampered with. For example, the microcontroller unit can poll the validity status of the sealing controller at booting time, and/or sporadically or periodically during runtime of the vehicle control unit.

It follows that the microcontroller unit of the vehicle control unit is provided with a trusted link to the sealing controller unit which allows, for example, secure booting and software authentication during runtime, and thus enables protective actions to be taken by the vehicle control unit when detecting a malicious attack to its housing.

As mentioned above, the electrical connector is configured to couple the microcontroller unit to the sealing controller unit. Thus, the electrical connector provides a communication channel coupling the microcontroller unit to the sealing controller unit, wherein the communication channel allows the microcontroller unit to verify the validity status of the sealing controller, see discussion above. Preferably, the communication channel is a wired communication link, further enhancing the security of operating the trusted link between the microcontroller unit and the sealing controller unit. For example, the communication channel can correspond to a Serial Peripheral Interface (SPI), an Universal Asynchronous Receiver-Transmitter (UART), or an Inter-Integrated Circuit (I2C) communication link.

In an example, the vehicle control unit comprises a mechanical coupling element adapted to mechanically couple the sealing controller unit and the housing. In this way, a mechanical force which is applied to the housing can be conveyed by the mechanical coupling element to the sealing controller unit, for example to mechanically impact a surface of the sealing controller unit. In an example, the mechanical coupling element comprises an elongated mechanical connecting element, such as for example a bar or pillar shaped mechanical component which is arranged inside the housing. In this case, a first end of the elongated mechanical coupling element is arranged to contact an inner surface of the housing, and can be adhered to or otherwise fixed to the inner surface of the housing for improving the mechanical contact and the corresponding force detection sensitivity of the arrangement. In an example, the second end of the mechanical element can be adhered to or otherwise fixed to a surface of the sealing controller unit.

Alternatively, the mechanical coupling element can include a cutting element, for example a cutting element fixed to the second end of the elongated mechanical coupling element. Thus, the mechanical coupling element can include a cutting element configured to scratch, cut or apply pressure to the surface of the sealing controller unit, or to otherwise mechanically impact the surface of the sealing controller unit, when the mechanical force is applied to the housing.

In an example, the surface of the sealing controller unit includes a protection membrane which is adapted to break upon receiving the mechanical impact of the mechanical coupling element. For example, the protection membrane can be adapted to influence electrical characteristics of the sealing controller unit when the protection membrane breaks, preferably by changing the validity state stored in the memory. Preferably, the protection membrane can correspond to a conductive mesh applied to the surface of the sealing controller unit. The protection membrane can have a predefined pattern having electrical connectivity which defines the validity state stored in the memory, wherein when the breaking of the protection membrane occurs, the conductive pattern is disrupted and/or damaged and thus changes the validity state.

In an example, the sealing controller unit comprises a liquid chamber filled with a liquid substance. The liquid chamber is adapted to spill the liquid substance inside the sealing controller when the mechanical coupling element causes a mechanical impact to a surface of the sealing controller unit. In this way, the mechanical impact to a surface of the sealing controller unit can influence electrical characteristics of the sealing controller unit, for example to change the validity state stored in the memory, for example by damaging the content integrity of the memory. For example, the mechanical change to the housing can change the validity state of the sealing controller unit by physically damaging the content integrity of a one-time programmable read-only-memory (ROM) chip. Preferably, such as to enhance this technical effect, the liquid substance is a chemical substance, further preferred an acid or conductive fluid, for example a conductive ink.

In a further example, the vehicle control unit comprises a sensor unit attached to the housing. The sensor unit is adapted to detect a mechanical change to the housing, for example to detect an attempt to separate the cover from the housing or to excise an opening into a surface of the housing. Such a sensor unit can, for example, include: a resistance sensor, an inductive sensor, a capacitive sensor, a piezoelectric sensor, an electromagnetic sensor, or a photoelectric sensor.

In any case, the sensor unit is electrically coupled to the sealing controller unit. Thus, the sensor unit is configured to convert a mechanical change to the housing to an electrical signal which is then conveyed via the electrical coupling to the sealing controller unit. In this way, the electrical signal received by the sealing controller unit can be used to change the validity state of the sealing controller unit, such as to indicate that a mechanical change has occurred to the housing, for example to indicate that the housing may have been tampered with. Preferably, the electrical signal received by the sealing controller unit can be used to physically damage by overvoltage the content integrity of the memory, for example of a one-time programmable read-only-memory (ROM).

For example, if the sensor unit is a piezoelectric element, the sensor unit converts a mechanical change to the housing to an electrical signal which is conveyed via electrical coupling to the sealing controller unit, and can be used to physically damage by overvoltage the content integrity of the memory. In this way, a very robust and reliable protection against malicious attacks is provided, which allows protection even when the vehicle control unit is powered off, because the respective electrical signal is generated using the piezoelectric effect.

BRIEF DESCRIPTION OF DRAWINGS

Further embodiments of the present invention are described in the following description of Figures. The present invention will be explained in the following by means of embodiments and with reference to drawings in which is shown.

Figure 1:
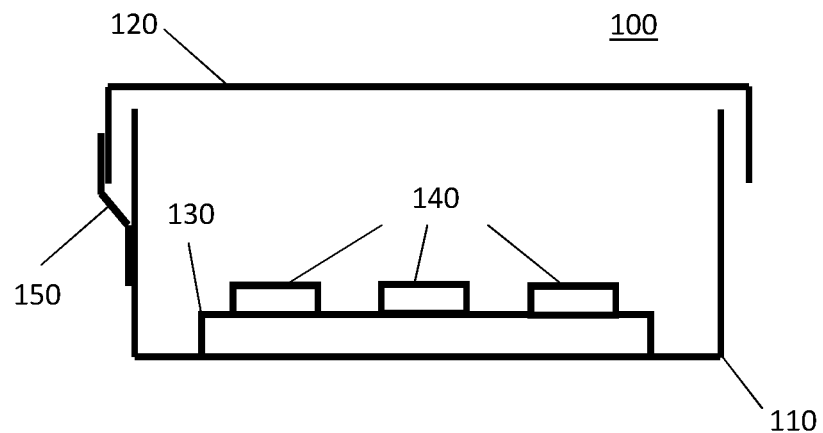
FIG. 1 illustrates a vehicle control unit protected with a sealing.

In the following, any statement made having regard to the direction of a component are made relative to the position shown in the drawing and can naturally vary in the actual position of application.

DETAILED DESCRIPTION

Figure 2:
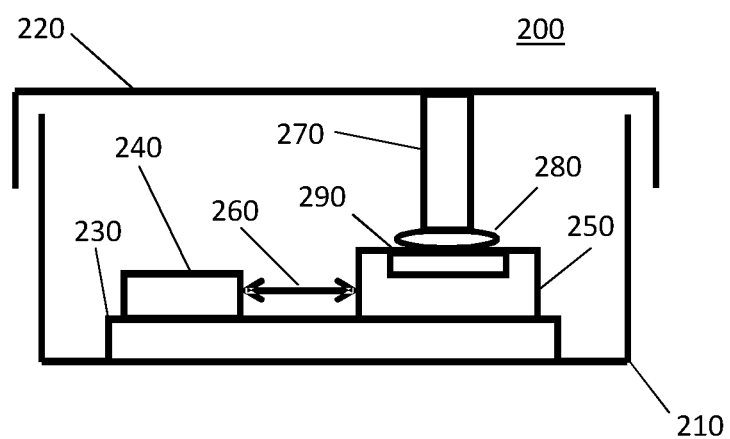
FIG. 2 illustrates a vehicle control unit with a mechanical coupling element.

FIG. 2 shows a vehicle control unit 200 according to the present invention, wherein the vehicle control unit 200 comprises a microcontroller unit 240 and a sealing controller unit 250 arranged on a substrate 230.

An electrical connector 260 is configured to couple the microcontroller unit 240 to the sealing controller unit 250. The electrical connector 260 provides a communication channel coupling the microcontroller unit 240 to the sealing controller unit 250 such as to allow the microcontroller unit 240 to verify a validity status of the sealing controller unit 250.

In this example, the sealing controller unit 250 includes as memory a memory chip for storing the validity state. The validity state corresponds to memory bits stored in the memory chip, and indicates whether a mechanical change has occurred to the housing 210, 220, or not.

More specifically, the vehicle control unit 200 comprises a housing 210, 220 enclosing the microcontroller unit 240, the sealing controller unit 250 and the electrical connector 260, such as to protect components of the vehicle control unit 200.

In this example, the housing 210 includes a cover 220 which is sealed by screwing elements to form a closed and protected cavity including components of the vehicle control unit 200.

Thus, the sealing controller unit 250 is configured to change its validity state if a mechanical change occurs to the housing 210, 220, and the microcontroller unit 240 is adapted to use the electrical connector 260 to verify the validity status of the sealing controller unit 250.

It follows that the microcontroller unit 240 can determine if a mechanical force has been applied to open or otherwise expose the interior of the housing 210, 220, for example to remove the cover 220 of the housing 210, 220 or to excise an opening into a surface of the housing 210, 220.

The vehicle control unit 200 is configured to provide a vehicle or car engine with controller functions and its microcontroller unit 240 is adapted to run software allowing such servicing. Thus, when the microcontroller unit 240 determines that the housing 210, 220 may have been tampered with, the vehicle control unit 200 can react by changing the controller behavior and/or by limiting access to sensitive information stored in the vehicle control unit 200, in particular sensitive information which could be maliciously tempered with.

For example, the vehicle control unit 200 could react by turning itself off, for example permanently, or by configuring itself to reduce the scope of provided controller functions. In this way, the possibility of maliciously manipulating the functioning of the vehicle control unit 200 is significantly reduced, for example by limiting the controller functions to include only the most essential functions which are required for safe operation of the vehicle.

In this example, the memory of the sealing controller unit 250 includes a one-time programmable read-only-memory (ROM) adapted to store a digital key corresponding to the stored validity status.

The microcontroller unit 240 comprises a hardware secure model (HSM) which has been used by the manufacturer, or at a corresponding garage activing the digital key, for generating a randomly generated digital key which is stored in the one-time programmable read-only-memory (ROM) of the sealing controller unit 250.

If the content of the digital key changes, or if the digital key is no longer accessible due to damage caused to the memory chip, the validity state of the sealing controller unit 250 is considered to have changed, indicating a mechanical change to the housing 210, 220.

As mentioned above, the microcontroller unit 240 is configured to use the electrical connector 260 to read the digital key of the sealing controller unit 250. Then, if the microcontroller unit 240 determines that the digital key cannot be authenticated, i.e. the digital key does not correspond to an expected value, is invalid or inaccessible, the microcontroller unit 250 concludes that a mechanical change has occurred to the housing 210, 220, indicating that the housing 210, 220 may have been tampered with.

The microcontroller unit 240 is configured to use an encryption/decryption algorithm to verify if the digital key stored in the memory of the sealing controller unit 250 is valid. For this purpose, the microcontroller unit 240 runs an advanced encryption standard (AES) based encryption algorithm to perform the authentication check, wherein the digital key stored in the memory of the sealing controller unit 250 is compared with a corresponding digital key stored in the microcontroller unit 240.

It follows that the microcontroller unit 240 of the vehicle control unit 200 is provided with a trusted link to the sealing controller unit 250 which allows, for example, secure booting and software authentication during runtime, and thus enables protective actions to be taken by the vehicle control unit 200 when a malicious attack to its housing 210, 220 is detected.

In this example, the microcontroller unit 240 uses the above arrangement to poll the validity status of the sealing controller unit 250 at booting time, and also periodically during runtime of the vehicle control unit 200. In this way, the microcontroller unit 240 can react to malicious attacks to the housing 210, 220 which may have been conducted prior to turning on the vehicle control unit 200, or which are conducted during operation of the device.

In FIG. 2, the communication channel provided by the electrical connector 260 is a wired communication link. In this way, it is more difficult to maliciously listen into or influence the trusted link between the microcontroller unit 240 and the sealing controller unit 250, further enhancing the security of operation.

As shown in FIG. 2, the vehicle control unit 200 comprises a mechanical coupling element 270 which mechanically couples the sealing controller unit 250 and the cover 220 of the housing. In this example, the mechanical coupling element 270 is an elongated connecting element having a first end and a second end, resembling a bar or pillar shaped mechanical component which is arranged inside the housing 210, 220.

The first end of the elongated mechanical coupling element 270 is adhered to contact an inner surface of the cover 220 in a fixed manner. In this way, a robust and reliable mechanical contact is provided between the elongated mechanical coupling element 270 and the cover 220, further enhancing the force detection sensitivity of the arrangement.

Similarly, the second end of the elongated mechanical coupling element 270 is adhered to a surface of the sealing controller unit 250. For this purpose, an adhesive layer 280 is arranged between the respective components.

It follows that a mechanical force which is applied to the housing 210, 220 is conveyed by the elongated mechanical coupling element 270 such as to mechanically impact a surface of the sealing controller unit 250. For example, a pulling force applied to remove the cover 220 of the housing is thus mechanically coupled to result in a corresponding pulling force being applied to the surface of the sealing controller unit 250.

In this example, the surface of the sealing controller unit 250, which is mechanically coupled to the elongated mechanical coupling element 270, includes a protection membrane 290.

More specifically, the protection membrane 290 includes a conductive mesh applied to the surface of the sealing controller unit 250. The conductive mesh is adapted to have a predefined pattern with electrical connectivity, such that the predefined electrical connectivity defines the validity state stored in the memory.

Accordingly, a mechanical force applied to remove the cover 220 of the housing is mechanically coupled by the elongated mechanical coupling element 270 to result in a corresponding mechanical force being applied to the protection membrane 290.

It follows that the protection membrane 290 breaks, and the mechanical impact of the mechanical coupling element 270 damages or disrupts the conductive mesh of the protection membrane 290 such as to change its electrical connectivity.

Hence, when the protection membrane 290 breaks, the change in its electrical connectivity influences electrical characteristics of the sealing controller unit 250, and thus changes the validity state stored in the memory.

For example, the protection membrane 290 and its corresponding conductive mesh can be used to form the ROM chip for storing the digital key of the sealing controller unit 250. Then, upon receiving the conveyer mechanical force applied to the surface of the housing 210, 220, the conductive mesh is damaged or disrupted, which damages or corrupts the digital key stored in the sealing controller unit 250.

It follows that when the microcontroller unit 240 polls the validity status of the sealing controller unit 250, it detects the possible malicious attack to the housing 210, 220, and reacts accordingly, see discussion above.

Figure 3:
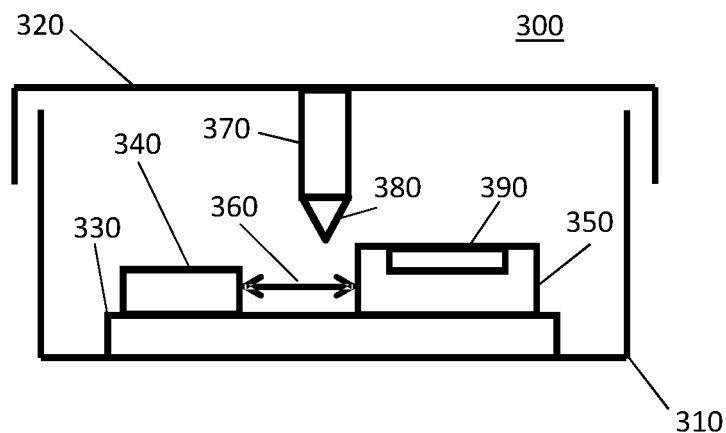
FIG. 3 illustrates a vehicle control unit including a cutting member.

FIG. 3 shows a related example of a vehicle control unit 300 having a housing 310, 320, a substrate 330, a microcontroller unit 340, a sealing controller unit 350 with a protection membrane 390 at its surface, an electrical connector 360, and an elongated mechanical coupling element 370, as discussed above in connection with the embodiment of FIG. 2.

However, in FIG. 3, rather than fixing the second end of the elongated mechanical coupling element 370 to a surface of the sealing controller unit 350, the second end of the elongated mechanical coupling element 370 is formed to include a cutting element 380, or a corresponding cutting element 380 is fixed to the second end of an elongated mechanical coupling element 370.

More specifically, the cutting element 380 is configured to scratch, cut or apply pressure to the surface of the sealing controller unit 350, or to otherwise mechanically impact the protection membrane 390 at the surface of the sealing controller unit 350, when the mechanical force is applied to the housing 320.

For example, as shown in FIG. 3, a lateral movement of the cover 320 would damage or disrupt the conductive mesh of the protection membrane 390, and thus change or damage the digital key stored in the sealing controller unit 250.

However, vibrations or other less relevant mechanical effects are unlikely to influence the protection membrane 390, because the cutting element 380 does not abut its surface under normal operating conditions.

Figure 4:
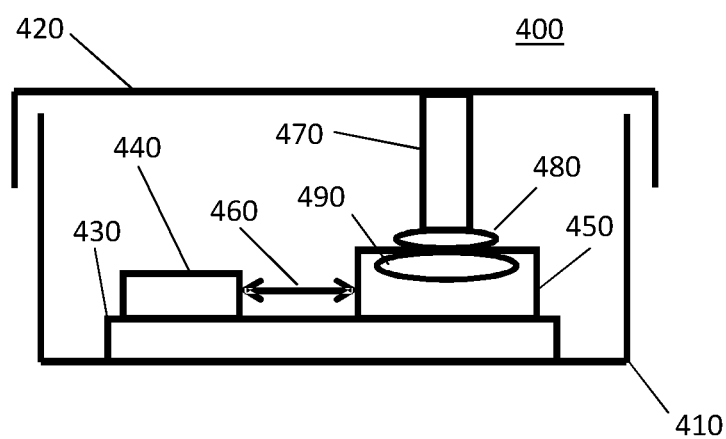
FIG. 4 illustrates a vehicle control unit including a liquid chamber.

FIG. 4 shows a related example of a vehicle control unit 400 having a housing 410, 420, a substrate 430, a microcontroller unit 440, a sealing controller unit 450, an electrical connector 460, and an elongated mechanical coupling element 470, as discussed above in connection with the embodiment of FIG. 2.

However, in the example of FIG. 4, the sealing controller unit 450 comprises at its surface a liquid chamber 490 filled with a liquid substance. The liquid chamber 490 is adapted to spill the liquid substance inside the sealing controller 450 when the mechanical coupling element 470 causes a mechanical impact to a surface of the sealing controller unit 450.

In this way, the respective mechanical impact causes the liquid substance to spill, which is then guided inside the sealing controller unit 450 to change electrical characteristics of the sealing controller unit 450, for example by short circuiting inner conductors of the sealing controller unit 450. For this purpose, the liquid substance used in FIG. 4 includes a conductive ink.

Accordingly, the respective mechanical impact to the housing 410, 420 changes the validity state stored in the memory of the sealing controller unit 450, such as to indicate a possible malicious attack to the vehicle control unit 400.

Figure 5:
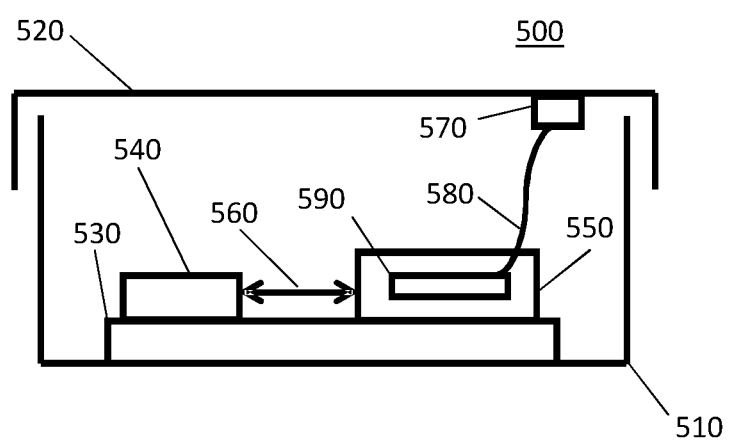
FIG. 5 illustrates a vehicle control unit including a piezoelectric element.

FIG. 5 shows a related example of a vehicle control unit 500 having a housing 510, 520, a substrate 530, a microcontroller unit 540, a sealing controller unit 550, and an electrical connector 560, as discussed above in connection with the embodiment of FIG. 2.

However, in contrast to the example of FIG. 2, the vehicle control unit 500 shown in FIG. 5 does not include a mechanical coupling element 270 for mechanically coupling the sealing controller unit 550 to the housing 510, 520.

Alternatively, the vehicle control unit 500 shown in FIG. 5 comprises a sensor unit 570 attached to the housing 510, 520, more specifically, to the cover 520 of the housing.

The sensor unit 570 is adapted to detect a mechanical change to the housing 520, for example to detect an attempt to separate the cover 520 from the housing 510 or to excise an opening into the surface of the housing 520.

As shown in FIG. 5, the sensor unit 570 is electrically coupled to the sealing controller unit 550 via sensor coupling means 580 comprised by the vehicle control unit 500.

Thus, the sensor unit 570 is configured to convert a mechanical change to the housing 520 to an electrical signal which is conveyed via the electrical coupling means 580 to the sealing controller unit 550.

Then, the electrical signal received by the sealing controller unit 550 is used to change the validity state of the sealing controller unit 550, such as to indicate that the housing 510, 520 may have been tampered with.

For this purpose, the electrical signal received by the sealing controller unit 550 physically damages by overvoltage the content integrity of the one-time programmable read-only-memory (ROM) 590, for example by having electrical conductors of the one-time programmable read-only-memory (ROM) 590 provide a fuse functionality.

The sensor unit 570 shown in FIG. 5 is a piezoelectric element. In this way, the respective electrical signal is generated using the piezoelectric effect, i.e. without requiring an electrical power source. This allows a very robust and reliable protection against malicious attacks, even when the vehicle control unit 500 is powered off.

LIST OF REFERENCE NUMERALS 100, 200, 300, 400, 500 vehicle control unit
110, 120, 210, 220, 310,
410, 420, 510, 520 housing and cover of the housing
130, 230, 330, 430, 530 substrate
140 components of the vehicle control unit
240, 340, 440, 540 microcontroller unit
250, 350, 450, 550 sealing controller unit
260, 360, 460, 560 electrical connector
270, 370, 470 elongated mechanical coupling element
570 sensor unit
280, 480 adhesive layer
380 cutting element
580 electrical coupling means
290, 390 protection membrane
490 liquid chamber
590 one-time programmable read-only-memory

We claim:

1. A vehicle control unit, comprising:
a microcontroller unit;
a sealing controller unit including a memory for storing a validity state of the sealing controller unit;
an electrical connector coupling the microcontroller unit to the sealing controller unit; and
a housing enclosing the microcontroller unit, the sealing controller unit and the electrical connector that, collectively, operate in concert to enable the vehicle control unit to:
detect, independent of a current power state of the vehicle control unit and using the sealing controller unit, a mechanical change to the housing;
change, using the sealing controller unit and independent of the current power state of the vehicle control unit, the validity state to indicate the detected mechanical change to the housing; and
determine, using the microcontroller unit and the electrical connector, that the validity state indicates the detected mechanical change.

2. The vehicle control unit according to claim 1, further comprising a mechanical coupling element adapted to mechanically couple the sealing controller unit and the housing, wherein the mechanical coupling element is adapted to mechanically impact a surface of the sealing controller unit when a mechanical force is applied to the housing.

3. The vehicle control unit according to claim 2, wherein the mechanical coupling element includes a cutting element configured to scratch, cut or apply pressure to the surface of the sealing controller unit when the mechanical force is applied to the housing.

4. The vehicle control unit according to claim 2, wherein the surface of the sealing controller unit includes a protection membrane which is adapted to break upon receiving a mechanical impact of the mechanical coupling element.

5. The vehicle control unit according to claim 4, wherein the protection membrane is adapted to influence electrical characteristics of the sealing controller unit when the protection membrane breaks to change the validity state stored in the memory.

6. The vehicle control unit according to claim 2, wherein the sealing controller unit comprises a liquid chamber filled with a liquid substance, wherein the liquid chamber is adapted to spill the liquid substance inside the sealing controller unit when the mechanical coupling element causes a mechanical impact to the surface of the sealing controller unit to influence electrical characteristics of the sealing controller unit to change the validity state stored in the memory.

7. The vehicle control unit according to claim 6, wherein the liquid substance is a chemical substance, an acid or conductive fluid, a conductive ink.

8. The vehicle control unit according to claim 1, wherein the microcontroller unit is configured to determine the validity state of the sealing controller unit by verifying a digital key stored in the memory of the sealing controller unit.

9. The vehicle control unit according to claim 8, wherein the microcontroller unit is configured to use an encryption/decryption algorithm to verify the digital key stored in the memory of the sealing controller unit.

10. The vehicle control unit according to claim 8, wherein the memory of the sealing controller unit includes a one-time programmable read-only-memory adapted to store the digital key of the sealing controller unit.

11. The vehicle control unit according to claim 10, wherein the sealing controller unit is configured such that the mechanical change to the housing can change the validity state of the sealing controller unit by physically damaging a content integrity of the one-time programmable read-only-memory.

12. The vehicle control unit according to claim 10, further comprising a sensor unit attached to the housing and electrically coupled to the sealing controller unit, wherein the sensor unit is configured to convert the mechanical change to the housing to an electrical signal which is conveyed to the sealing controller unit such as to physically damage a content integrity of the one-time programmable read-only-memory, wherein the sensor unit is a piezoelectric element.

13. The vehicle control unit according to claim 1, wherein the microcontroller unit is configured to poll a validity status of the sealing controller unit at booting time, and or sporadically or periodically during runtime of the vehicle control unit.

14. The vehicle control unit according to claim 1, wherein the electrical connector provides a communication channel coupling the microcontroller unit to the sealing controller unit.

15. The vehicle control unit according to claim 1, wherein the vehicle control unit is configured to provide a vehicle or car engine with controller functions, and wherein the vehicle control unit is further configured to reduce a scope of controller functions if it determines the change in the validity state of the sealing controller unit.

16. A method of protecting a vehicle control unit, the method comprising:
  coupling, with an electrical connector, a microcontroller unit to a sealing controller unit that includes a memory for storing a validity state;
  enclosing, with a housing, the microcontroller unit, the sealing controller unit and the electrical connector;
  detecting, independent of a current power state of the vehicle control unit and with the sealing controller unit, a mechanical change to the housing;
  changing, using the sealing controller unit and independent of the current power state of the vehicle control unit, the validity state to indicate the detected mechanical change; and
  determining, using the microcontroller unit and the electrical connector, that the validity state indicates the detected mechanical change.

17. The method according to claim 16, wherein the vehicle control unit further comprises a mechanical coupling element adapted to mechanically couple the sealing controller unit and the housing, wherein the mechanical coupling element is adapted to mechanically impact a surface of the sealing controller unit when a mechanical force is applied to the housing.

18. The method according to claim 17, wherein the mechanical coupling element includes a cutting element configured to scratch, cut or apply pressure to the surface of the sealing controller unit when the mechanical force is applied to the housing.

19. The method according to claim 17, wherein the surface of the sealing controller unit includes a protection membrane which is adapted to break upon receiving a mechanical impact of the mechanical coupling element.

20. The method according to claim 19, wherein the protection membrane is adapted to influence electrical characteristics of the sealing controller unit when the protection membrane breaks such as to change the validity state stored in the memory.

21. The method according to claim 17, wherein the sealing controller unit comprises a liquid chamber filled with a liquid substance, wherein the liquid chamber is adapted to spill the liquid substance inside the sealing controller unit when the mechanical coupling element causes a mechanical impact to the surface of the sealing controller unit such as to influence electrical characteristics of the sealing controller unit to change the validity state stored in the memory.

22. The method according to claim 16, wherein the microcontroller unit is configured to determine the validity state of the sealing controller unit by verifying a digital key stored in the memory of the sealing controller unit.

23. The method according to claim 22, wherein the microcontroller unit is configured to use an encryption/decryption algorithm to verify the digital key stored in the memory of the sealing controller unit.

24. The method according to claim 22, wherein the memory of the sealing controller unit includes a one-time programmable read-only-memory adapted to store the digital key of the sealing controller unit.

25. The method according to claim 24 wherein the sealing controller unit is configured such that the mechanical change to the housing can change the validity state of the sealing controller unit by physically damaging a content integrity of the one-time programmable read-only-memory.

26. The method according to claim 24, wherein the vehicle control unit further comprises a sensor unit attached to the housing and electrically coupled to the sealing controller unit, wherein the sensor unit is configured to convert the mechanical change to the housing to an electrical signal which is conveyed to the sealing controller unit such as to physically damage a content integrity of the one-time programmable read-only-memory.

27. The method according to claim 16, wherein the microcontroller unit is configured to poll a validity status of the sealing controller unit at booting time, and or sporadically or periodically during runtime of the vehicle control unit.

28. The method according to claim 16, wherein the electrical connector provides a communication channel coupling the microcontroller unit to the sealing controller unit.

29. The method according to claim 16, wherein the vehicle control unit is configured to provide a vehicle or car engine with controller functions, and wherein the vehicle control unit is further configured to reduce a scope of controller functions if it determines the change in the validity state of the sealing controller unit.

* * * * *